United States Patent
He

(10) Patent No.: US 11,708,855 B2
(45) Date of Patent: Jul. 25, 2023

(54) TWO-PIECE COMPOSITE TAPERED ROLLER BEARING OUTER RING WITH INTERFERENCE FIT

(71) Applicant: THE TIMKEN COMPANY, North Canton, OH (US)

(72) Inventor: Ming He, Canton, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 17/618,183

(22) PCT Filed: Jun. 24, 2020

(86) PCT No.: PCT/US2020/039395
§ 371 (c)(1),
(2) Date: Dec. 10, 2021

(87) PCT Pub. No.: WO2021/011164
PCT Pub. Date: Jan. 21, 2021

(65) Prior Publication Data
US 2022/0268312 A1     Aug. 25, 2022

Related U.S. Application Data
(60) Provisional application No. 62/874,139, filed on Jul. 15, 2019.

(51) Int. Cl.
F16C 19/36     (2006.01)
F16C 33/58     (2006.01)
(Continued)

(52) U.S. Cl.
CPC .......... *F16C 19/364* (2013.01); *F16C 33/585* (2013.01); *F16C 33/60* (2013.01);
(Continued)

(58) Field of Classification Search
CPC .... F16C 19/364; F16C 33/585; F16C 33/586; F16C 33/60; F16C 33/62; F16C 33/64;
(Continued)

(56) References Cited

U.S. PATENT DOCUMENTS 2,225,710 A      12/1940   Norris
2,376,779 A  *   5/1945    Kendall ................. F16C 33/64
                                                       29/898.066
(Continued)

FOREIGN PATENT DOCUMENTS

DE     102005019481 A1    11/2006
DE     102005019474 B4    5/2007
(Continued)

OTHER PUBLICATIONS

WO2009040172_A1 _description.*
(Continued)

*Primary Examiner* — Phillip A Johnson
(74) *Attorney, Agent, or Firm* — Michael Best & Friedrich LLP

(57) ABSTRACT

An outer ring (26) for a bearing assembly includes an annular backing member (54) having a body, and an annular race member (50). The body has a first portion defining a radial inner surface (98) and a radial outer surface, and a second portion defining an axially-facing base surface (110) and a radially-facing end surface (118). The annular race member has a radial outer face (58) and a radial inner face, and a first axial end face and a second axial end face (70) that both extend between the radial outer face and the radial inner face. The annular backing member is in press-fit engagement with the annular race member such that the radial outer face of the annular race member engages the radial inner surface of the annular backing member and the second axial end face of the annular race member engages the axially-facing base (Continued)

surface of the annular backing member such that the members are unitized.

10 Claims, 4 Drawing Sheets

(51) Int. Cl.
*F16C 35/077* (2006.01)
*F16C 33/64* (2006.01)
*F16C 33/60* (2006.01)

(52) U.S. Cl.
CPC ............ *F16C 33/64* (2013.01); *F16C 35/077* (2013.01); F16C 2220/04 (2013.01); F16C 2220/42 (2013.01); F16C 2220/48 (2013.01); F16C 2223/10 (2013.01); F16C 2226/12 (2013.01); F16C 2229/00 (2013.01)

(58) Field of Classification Search
CPC F16C 35/077; F16C 2223/10; F16C 2223/12; F16C 2223/14; F16C 2223/16; F16C 2223/18; F16C 2229/00
See application file for complete search history.

(56) References Cited

U.S. PATENT DOCUMENTS

| | | | |
|---|---|---|---|
| 3,749,460 A | 7/1973 | Hogan | |
| 4,427,241 A * | 1/1984 | Jatczak | F16C 19/364 384/560 |
| 5,125,256 A | 6/1992 | Ohkubo et al. | |
| 7,866,891 B2 | 1/2011 | Waseda et al. | |
| 8,424,208 B2 | 4/2013 | Kobayashi et al. | |
| 8,827,564 B2 | 9/2014 | Hamada et al. | |
| 9,951,855 B2 | 4/2018 | Shibutani et al. | |
| 2001/0022478 A1* | 9/2001 | Obara | G11B 19/2009 310/90 |
| 2014/0341491 A1 | 11/2014 | Cordier et al. | |
| 2015/0071581 A1 | 3/2015 | Gieser | |
| 2016/0281785 A1 | 9/2016 | Campbell et al. | |
| 2017/0276022 A1 | 9/2017 | Beer et al. | |
| 2018/0243814 A1 | 8/2018 | Mizuta et al. | |

FOREIGN PATENT DOCUMENTS

| | | | | |
|---|---|---|---|---|
| DE | 102009031625 A1 | | 1/2011 | |
| DE | 102013225341 A1 | * | 6/2015 | ............ F16C 35/073 |
| EP | 0545384 A1 | | 6/1993 | |
| GB | 1181472 A | * | 2/1970 | ............. F16C 33/14 |
| GB | 1341122 A | * | 12/1973 | |
| JP | S5693520 U | | 7/1981 | |
| JP | H588710 U | | 12/1993 | |
| JP | 2005140157 A | | 6/2005 | |
| WO | 2006008376 A1 | | 1/2006 | |
| WO | 2006057310 A1 | | 6/2006 | |
| WO | WO-2009040172 A1 | * | 4/2009 | ............ F16C 19/364 |

OTHER PUBLICATIONS

Indian Patent Office Action for Application No. 202117059154 dated Jun. 28, 2022 (6 pages).
International Search Report and Written Opinion for Application No. PCT/US2020/039395 dated Oct. 9, 2020 (16 pages).
Japanese Patent Office Notice of Reasons for Refusal for Application No. 2021-573858 dated Jan. 25, 2023 (6 pages including English translation).

* cited by examiner

TWO-PIECE COMPOSITE TAPERED ROLLER BEARING OUTER RING WITH INTERFERENCE FIT

RELATED APPLICATIONS

This application claims the benefit of U.S. Provisional Patent Application No. 62/874,139 filed Jul. 15, 2019, the entire content of which is hereby incorporated by reference herein.

BACKGROUND

The present invention relates to tapered roller bearings, and more specifically to outer rings of tapered roller bearings.

Conventional outer rings for tapered roller bearings are machined from barstock or forged. However, some attempts have been made to form outer rings from sheet metal when this process is more cost effective. But there are additional technical challenges involved with using sheet metal. For instance, one consideration for bearing design includes the fact that an outer ring made of sheet metal by itself may not be able to support the high loads and high contact pressure of some bearings, due to the thin thickness of the sheet metal outer rings. One method used to provide enough support involves combining sheet metal outer rings with a separable backing ring.

Additionally, outer rings stamped from thin sheet metal are typically wavy as a result of being formed from the thin sheet metal. This waviness prevents the outer ring from maintaining consistent contact with the rollers and backing ring and thereby causes repeated deformation under cyclic loading. A wavy raceway is also a source of noise and vibration, which can effectively reduce the bearing's service life. Furthermore, backing rings are typically formed as an integral part of a housing of the bearing to reduce costs. With the backing rings fixed in the housing, the outer rings may not be adjusted axially in the housing to provide the correct preload for the bearing.

Another method used to provide enough support without a backing ring involves forming an outer ring that has a thick cross-section so that the outer ring can support the higher loads and higher contact pressure by itself. To form an outer ring of this size from sheet metal, thicker sheet metal must be used. It is difficult, however, to form an outer ring that has a back face with a thick cross-section, from a blank with a small diameter to thickness ratio (i.e., from thicker sheet metal), as is required to correctly form the needed geometry of the outer ring.

SUMMARY

Embodiments of the invention provide an outer ring for a tapered roller bearing that can provide sufficient support of the service load exerted on a bearing, without using a separable backing ring or forming the outer ring from thick sheet metal. The embodiments also avoid waviness of the race that is stamped from a thin sheet steel, thereby effectively eliminating the risk of high noise and vibration during operation. Embodiments of the invention also provide an outer ring that may be axially adjusted within a housing of a bearing to provide a correct preload. This is achieved by separately forming a backing member and a raceway member, and press-fitting the two members together to form a unitized, composite tapered roller bearing outer ring.

In one aspect, the invention provides an outer ring for a bearing assembly. The outer ring includes an annular backing member and an annular race member. The annular backing member has a body with a first portion and a second portion. The first portion defines a radial inner surface and a radial outer surface. The second portion extends at an angle away from the first portion and defines an axially-facing base surface and a radially-facing end surface. The annular race member has a radial outer face, a radial inner face, a first axial end face, and a second axial end face. Each axial end face extends between the radial outer face and the radial inner face. The annular backing member is in press-fit engagement with the annular race member such that the radial outer face of the annular race member engages the radial inner surface of the annular backing member and the second axial end face of the annular race member engages the axially-facing base surface of the annular backing member such that the annular backing member and the annular race member are unitized.

In another aspect, the invention provides a bearing assembly. The bearing assembly includes a housing, an outer ring engaged with the housing, an inner ring defining an inner race, a plurality of rolling elements, and a shaft extending through the inner ring. The outer ring includes an annular backing member and an annular race member. The annular backing member has a body with a first portion and a second portion. The first portion defines a radial inner surface and a radial outer surface. The second portion extends at an angle away from the first portion and defines an axially-facing base surface and a radially-facing end surface. The annular race member has a radial outer face, a radial inner face, a first axial end face, and a second axial end face. Each axial end face extends between the radial outer face and the radial inner face. The annular backing member is in press-fit engagement with the annular race member such that the radial outer face of the annular race member engages the radial inner surface of the annular backing member and the second axial end face of the annular race member engages the axially-facing base surface of the annular backing member such that the annular backing member and the annular race member are unitized. The plurality of rolling elements are rollingly engaged with the inner race and the outer race such that the inner ring is configured to rotate relative to the outer ring. The shaft is coupled to the inner ring such that the inner ring is configured to rotate with the shaft.

In still another aspect, the invention provides a method of manufacturing an outer ring of a bearing assembly. The method includes forming an annular backing member, the annular backing member having a body with a first portion defining a radial inner surface and a radial outer surface, and a second portion extending at an angle away from the first portion and defining an axially-facing base surface and a radially-facing end surface. The method further includes forming an annular race member from a sheet metal blank, the annular race member having a radial outer face, a radial inner face, a first axial end face, and a second axial end face, each axial end face extending between the radial outer face and the radial inner face. The method then includes press-fitting the annular backing member and the annular race member together such that the annular backing member and the annular race member form a unitized outer ring in which the radial outer face of the annular race member engages the radial inner surface of the annular backing member and the second axial end face of the annular race member engages the axially-facing base surface of the annular backing member.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
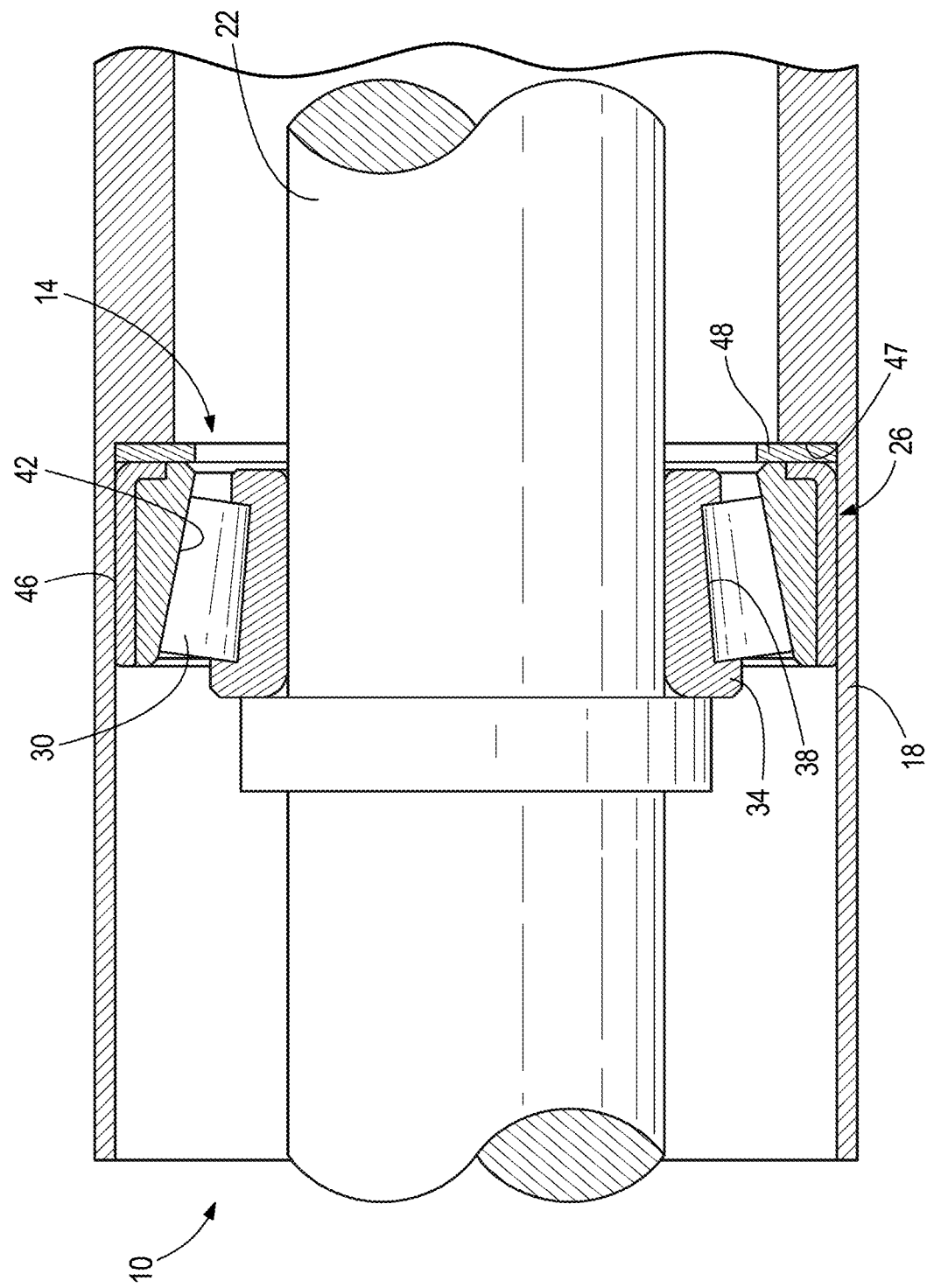
FIG. 1 is a partial section view of a bearing assembly using a composite tapered roller bearing outer ring according to the present invention.

Referring to FIG. 1, a bearing assembly 10 is illustrated. The bearing assembly 10 can be used in any number of applications, including in general industrial and automotive applications, and includes a bearing 14, a housing 18, and a shaft 22. The bearing 14 includes a unitized, composite outer ring 26, a plurality of rolling elements 30, and an inner ring 34. The inner ring 34 defines an inner raceway 38 and the unitized, composite outer ring 26 defines an outer raceway 42. The plurality of rolling elements 30 are rollingly engaged with both the outer raceway 42 and the inner raceway 38 such that the inner ring 34 is rotatable relative to the unitized, composite outer ring 26. The shaft 22 extends through the inner ring 34 and is coupled to the inner ring 34 such that the inner ring 34 rotates with the shaft 22.

The unitized, composite outer ring 26 is engaged with an inner surface 46 of the housing 18 such that an axial preload force is exerted on the unitized, composite outer ring 26, the rolling elements 30, and the inner ring 34. More specifically, the inner surface 46 of the housing 18 may include a shoulder 47 to support an axially-facing end surface of the outer ring 26. A spacer 48 is used between the shoulder 47 and the outer ring 26 to obtain the desired preload. The thickness of the spacer 48 can be selected/varied to achieve the desired bearing preload.

A magnitude of the preload force affects the performance of the bearing assembly 10. When the magnitude of the preload force is too small, which may cause a small amount of axial clearance (i.e., end play) within the mounted bearing, the unitized, composite outer ring 26 and the inner ring 34 do not exert great enough normal forces on the rolling elements 30. Because the normal forces are too small, the inner ring 34 and the unitized, composite outer ring 26 do not exert frictional forces on the rolling elements 30 that are great enough to cause the rolling elements 30 to roll along the inner and outer raceways 38, 42. In this scenario, the rolling elements 30 instead slide along the inner and/or outer raceways 38, 42, which negatively affects the performance of the bearing assembly 10. When the magnitude of the preload force is too large, which may cause an amount of axial interference within the mounted bearing, the unitized, composite outer ring 26 and the inner ring 34 exert normal forces on the rolling elements 30 that are too large. Because the normal forces are too large, the inner ring 34 and the unitized, composite outer ring 26 exert frictional forces on the rolling elements 30 that are great enough to hinder or prevent the rolling elements 30 from rolling along the inner and outer raceways 38, 42. In this scenario, the rolling elements 30 cannot move properly along the inner and outer raceways 38, 42, and the inner ring 34 is not properly rotatable with respect to the unitized, composite outer ring 26. To achieve the correct bearing setting/preload in the mounted bearing assembly 10, the spacer 48 can be used to adjust the relative axial position between the outer ring 26 and the inner ring 34. The thickness of the spacer 48 can be easily modified. In other embodiments, the spacer 48 may not be required when bearing preload can be adjusted by other means, for example, by adjusting the axel position of the shaft 22 relative to the inner ring 34.

In the illustrated embodiment, the magnitude of the axial preload force may be adjusted to ensure desirable performance of the bearing assembly 10. To adjust the axial preload force, the unitized composite outer ring 26 may be moved axially within the housing 18 via the spacer 48. Axial movement of the unitized, composite outer ring 26 within the housing 18 away from the inner ring 34 decreases the magnitude of the preload force, while axial movement of the unitized, composite outer ring 26 within the housing 18 towards the inner ring 34 increases the magnitude of the preload force. Rolling behavior of the rolling elements 30 can thereby be tailored to achieve desired performance characteristics for the bearing assembly 10.

In the illustrated embodiment, the bearing 14 is of relatively large size, and therefore exerts relatively higher loads and relatively higher contact pressures on the outer ring 26. To be more cost effective, at least a portion of the outer ring 26 is formed from sheet metal. To support the higher loads and contact pressures while being at least partially formed from sheet metal, the outer ring 26 shown in FIG. 2 includes an annular race member 50 and an annular backing member 54. The annular race member 50 is engaged with the annular backing member 54 to provide a unitized, composite outer ring 26. The thickness of the composite outer ring 26 is determined by the force and torque it will receive for the particular bearing application to ensure proper bearing performance without causing any relative motion between the two components of the outer ring 26, and without yielding under the exerted work force.

Figure 3:
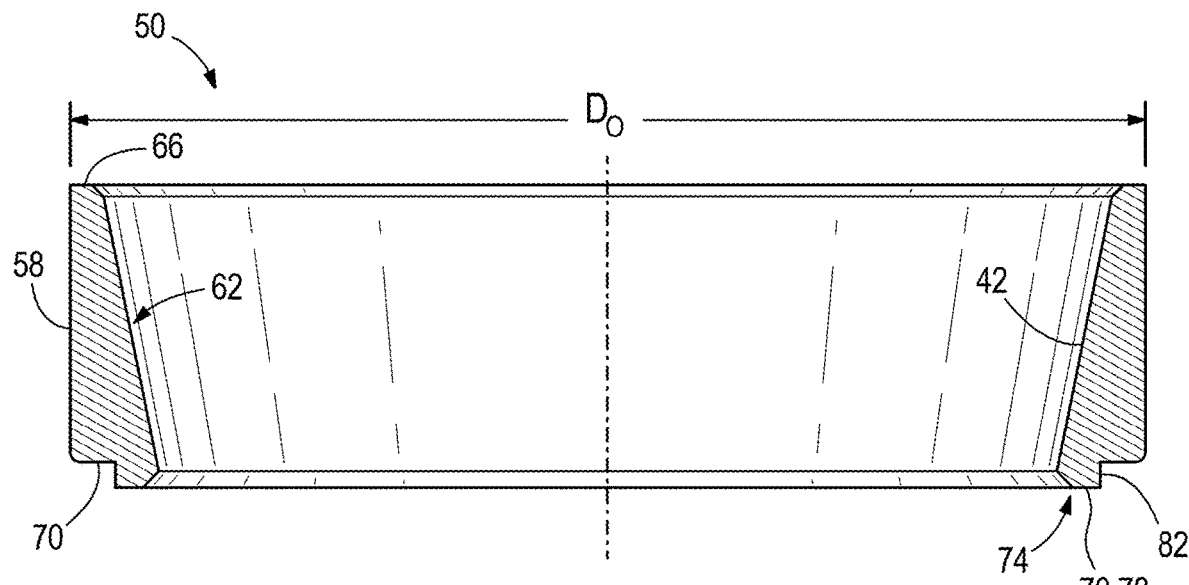
FIG. 3 is a section view of a race member of the composite tapered roller bearing outer ring of FIG. 1.
Figure 4:
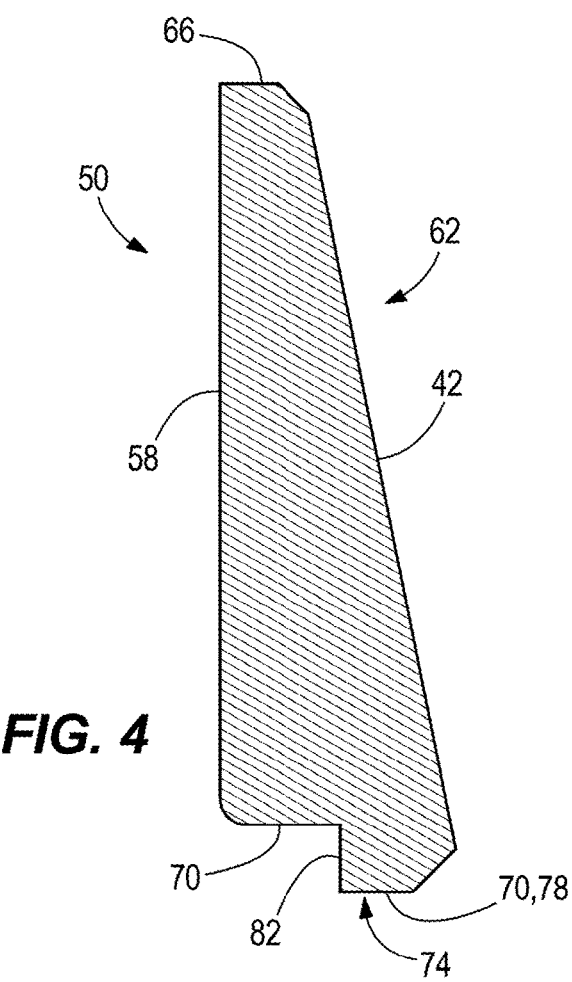
FIG. 4 is an enlarged section view of the race member of the composite tapered roller bearing outer ring of FIG. 1.

Referring to FIGS. 3 and 4, the annular race member 50 has a radial outer face 58, a radial inner face 62, a first axial end face 66, and a second axial end face 70. The radial inner face 62 defines the outer raceway 42 on which the rolling elements 30 roll. In the illustrated embodiment, the radial inner face 62 is sloped such that the bearing 14 is a tapered roller bearing. The slope of the radial inner surface 62 relative to the second axial end face 70 can vary depending upon the application. The first axial end face 66 and the second axial end face 70 extend between the radial outer face 58 and the radial inner face 62. The second axial end face 70 includes a step 74 that protrudes axially away from the first axial end face 66 such that the step 74 is partially defined by the radial inner face 62 and is partially defined by the second axial end face 70. The step 74 includes an axially-facing step face 78 and a radially-facing step face 82. In the illustrated embodiment, the axially-facing step face 78 is part of the second axial end face 70 and extends parallel to a remainder of the second axial end face 70, but in other embodiments, the axial step face 78 may extend at an angle relative to the remainder of the second axial end face 70. Similarly, the radially-facing step face 82 extends parallel to the radial outer face 58 in the illustrated embodiment, but in other embodiments, the radially-facing step face 82 may extend at a non-parallel angle relative to the radial outer face 58.

Figure 5:
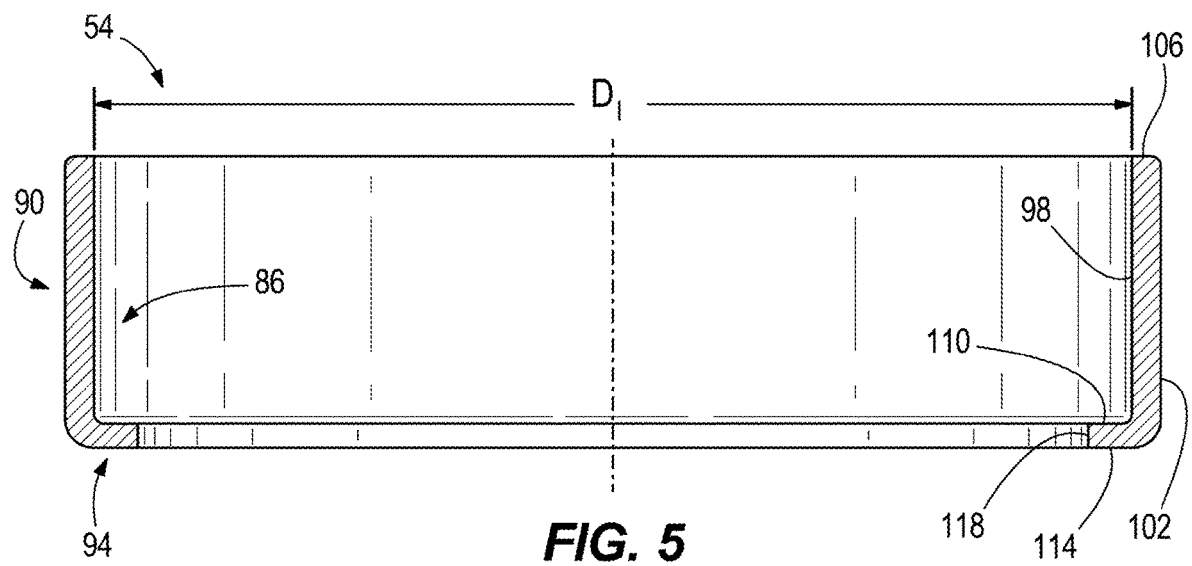
FIG. 5 is section view of a backing member of the composite tapered roller bearing outer ring of FIG. 1.
Figure 6:
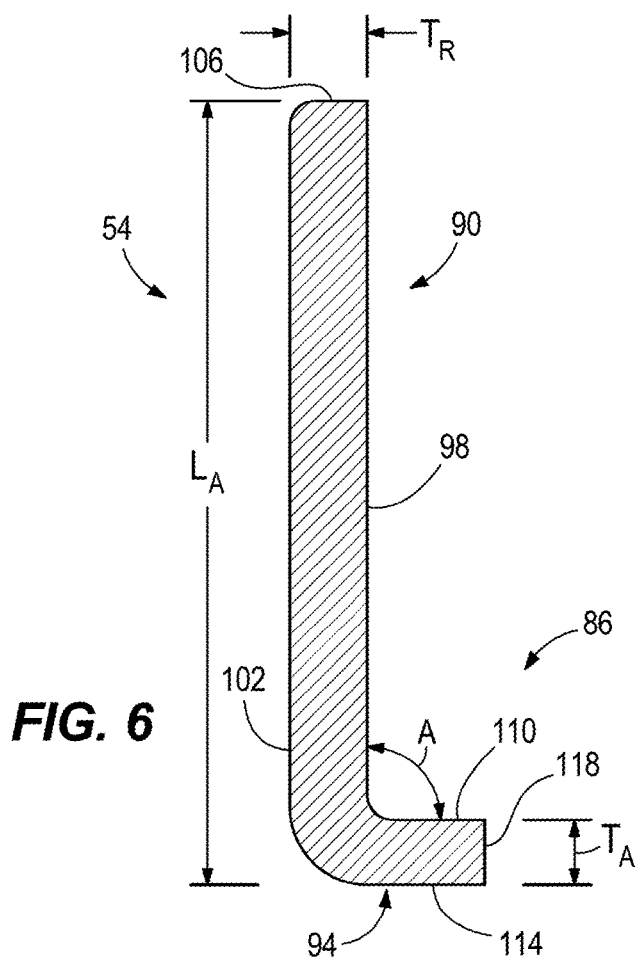
FIG. 6 is an enlarged section view of the backing member of the composite tapered roller bearing outer ring of FIG. 1.

Referring to FIGS. 5 and 6, the annular backing member 54 has a body 86 with a first portion 90 and second portion 94. The second portion 94 extends away from the first portion 90 at an angle A. In the illustrated embodiment, the angle A is 90 degrees, but in other embodiments, the angle A may be slightly more acute, for example 89 or 88 degrees, to provide better engagement between the annular race member 50 and the annular backing member 54 when the annular race member 50 is engaged with the annular backing member 54. Preferably, the angle A is not much more acute than 90 degrees because a more acute angle A makes it more difficult to engage the annular race member 50 with the annular backing member 54. Preferably also, the angle A is not greater than 90 degrees because the annular race member 50 may become disengaged from and slide out of the annular backing member 54. The first portion 90 defines a radial inner surface 98, a radial outer surface 102, and an axially-facing front surface 106. The axially-facing front surface 106 extends between the radial inner surface 98 and the radial outer surface 102 to define a radial thickness $T_R$. The second portion 94 defines an axially-facing base surface 110, an axially-facing end surface 114, and a radially-facing end surface 118. The radial outer surface 102 extends between the axially-facing front surface 106 and the axially-facing end surface 114 to define an axial length LA.

The radially-facing end surface 118 extends between the axially-facing base surface 110 and the axially-facing end surface 114 to define an axial thickness $T_A$. In the illustrated embodiment, the radially-facing end surface 118 extends parallel to the radial outer surface 102, but in other embodiments, the radially-facing end surface 118 may extend at a non-parallel angle relative to the radial outer surface 102. The axial thickness $T_A$ and the radial thickness $T_R$ must be sufficiently thick to support the annular race member 50 in both the axial direction and the radial direction when the annular race member 50 and the annular backing member 54 are unitized. When the annular backing member 54 is made from sheet metal, the axial thickness $T_A$ and the radial thickness $T_R$ can be the same, as shown in the illustrated embodiments, and can equal the thickness of the sheet metal from which the annular backing member 54 is formed (e.g., punched, stamped, or extruded). In other embodiments, the axial thickness may not be the same as the radial thickness. For example, the axial thickness may be thinner than the radial thickness. Similarly, in some embodiments, the axial thickness and the radial thickness may be thicker or thinner than the thickness of the sheet metal from which the annular backing member 54 is formed, depending on how the annular backing member 54 is manufactured. The radial outer surface 102 engages the housing 18, and more specifically the inner surface 46 of the housing 18, when the bearing 14 is mounted in the bearing assembly 10.

Referring now to FIGS. 3 and 5, the radial outer face 58 of the annular race member 50 defines an outer diameter $D_O$, and the radial inner surface 98 of the annular backing member 54 defines an inner diameter $D_I$. The inner diameter $D_I$ is smaller than the outer diameter $D_O$ such that, when the outer member 54 and the race member 50 are assembled, the inner diameter $D_I$ and the outer diameter $D_O$ define an interference fit between the members 50, 54. The interference fit allows the annular race member 50 to be held tightly in place axially with respect to the annular backing member 54 when the annular race member 50 is unitized with the annular backing member 54. The interference fit must be sufficient to prevent the annular race member 50 from slipping out of the annular backing member 54 due to axial forces acting on the unitized, composite outer ring 26 or temperature variations occurring within the bearing 14 during bearing 14 operation. The interference fit also allows the annular race member 50 to be held tightly in place rotationally with respect to the annular backing member 54 when the annular race member 50 is unitized with the annular backing member 54. The interference fit must also be sufficient to prevent the annular race member 50 from rotating relative to the annular backing member 54 due to rotational forces and torques acting on the unitized, composite outer ring 26 or temperature variations occurring within the bearing 14 during bearing 14 operation.

Figure 2:
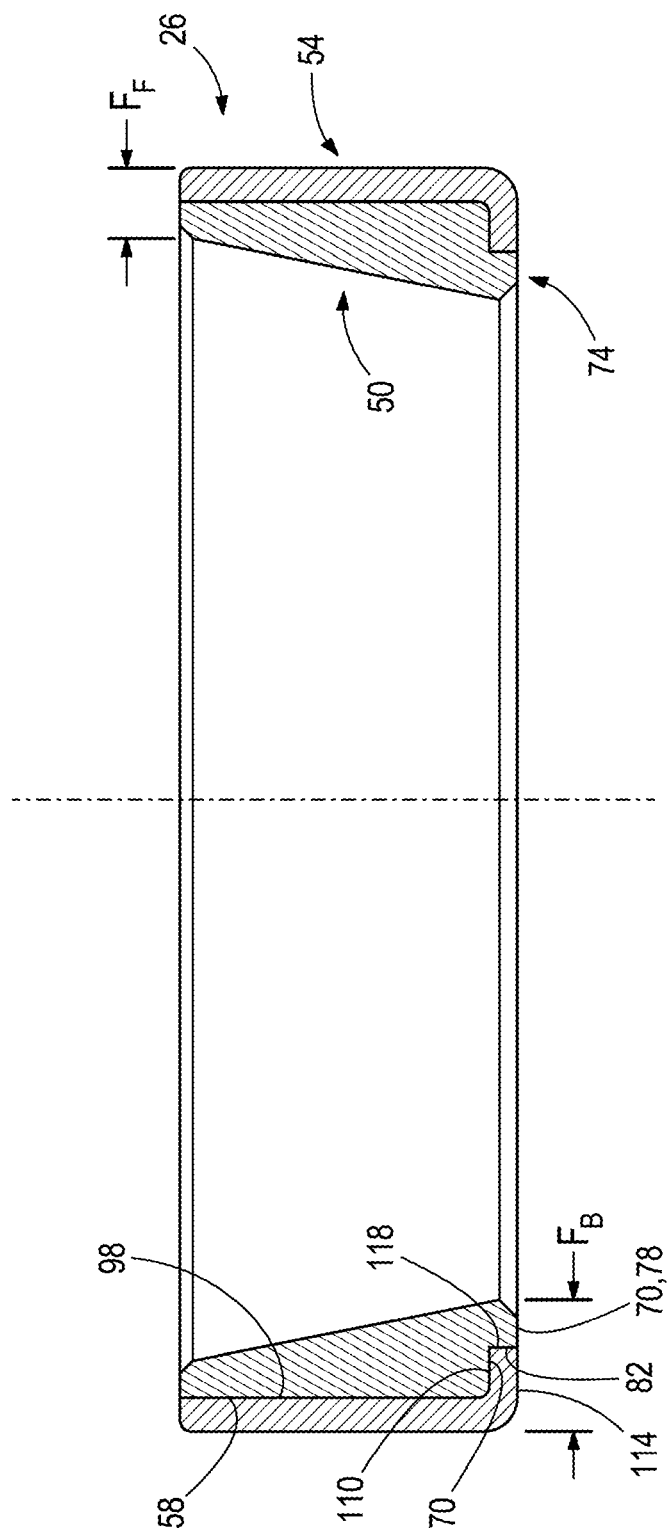
FIG. 2 is a section view of the unitized, composite tapered roller bearing outer ring of FIG. 1.

As shown in FIG. 2, when the annular race member 50 is unitized with the annular backing member 54, the radial outer face 58 of the annular race member 50 engages the radial inner surface 98 of the annular backing member 54 to radially support the annular race member 50. The second axial end face 70 of the annular race member 50, and more specifically the portion of the second axial end face 70 not defining the axially-facing step 78, engages the axially-facing base surface 110 of the annular backing member 54 to axially support the annular race member 50. Also upon unitization, the radially-facing step face 82 of the step 74 engages the radially-facing end surface 118 of the annular backing member 54 to provide additional radial support for the annular race member 50. The step 74 also allows the radial inner face 62 of the race member 50 to extend along the full length of the axial length LA so that the annular backing member 54 does not and cannot come into contact with the rolling elements 30 once installed.

Additionally, upon unitization, the axially-facing step face 78 of the step 74 is co-planar with the second axial end face 114 of the annular backing member 54 to define a co-planar unitized outer ring back face having a total radial length $F_B$. Unitization also brings the axially-facing front surface 106 of the annular backing member 54 to be co-planar with the first axial end face 66 of the annular race member 50 to define a co-planar unitized outer ring front face having a total radial length $F_F$. In other embodiments, this need not be the case. To ensure that the radial thickness $T_R$ and the axial thickness $T_A$ of the annular backing member 54 are robust enough to support the annular race member 50, dimensions of the radial thickness $T_R$ and a radial length of the axially-facing base surface 110 are preferably functions of the outer ring front face length $F_F$ and the outer ring back face length $F_B$, respectively.

To manufacture the unitized, composite outer ring 26, the annular race member 50 and the annular backing member 54 are first manufactured separately. To manufacture the annular race member 50, a sheet metal blank is blanked from a relatively thin sheet of sheet metal with a thickness that is thinner relative to the thickness of the second axial end face 70. In the illustrated embodiment, the sheet metal blank can be made by a laser cutting or press blanking process, but other methods may be used to blank the sheet metal. The sheet metal blank is then stamped or formed to become the annular race member 50. Because the rolling elements 30 roll directly on the annular race member 50 and cyclically load the annular race member 50, the sheet metal from which the annular race member 50 is formed is a high grade steel (e.g., high-carbon steel). The high grade steel ensures that the annular race member 50 has a sufficiently high strength and long service life. In the illustrated embodiment, punches and dies are used to form the annular race member 50 in a series of steps, but other methods of forming may be used. Forming the annular race member 50 using punches and dies includes, but is not limited to, the steps of blanking, drawing or extruding, coining or sizing, and/or piercing.

In the illustrated embodiment, the annular backing member 54 is manufactured in a similar manner to that of the annular race member 50, although in other embodiments, the annular race member 50 and the annular backing member 54 may be formed by different methods. A second sheet metal blank is separately blanked from sheet metal and formed with punches and dies into the annular backing member 54. The sheet metal from which the annular backing member 54 is formed, however, is not required to be a high grade steel, because the annular backing member 54 is not engaged with the rolling elements 30. The sheet metal from which the annular backing member 54 is formed is preferably a lower grade steel (e.g., low to medium carbon steels) to reduce material costs. In other embodiments, the annular backing member 54 may not even be formed from sheet metal, but instead may be formed from engineering plastic, nylons, fiberglass, or other materials that have high strength and that cost less than sheet metal. In this case, the annular backing member 54 may be formed by machining, injection molding, or other manufacturing processes. The annular backing member 54 may be formed from any material using any manufacturing method, provided the annular backing member 54 has sufficient strength, hardness, and thermal stability to support the annular race member 50.

In most cases, the members 50, 54 could be any type of plain or alloy carbon steels with varying carbon and alloy contents, depending on the applications and process treatment requirements. The low- to med-carbon steels usually require less forming force during stamping because these steels have lower yield strength and are easier to be plastically deformed; hence, smaller stamping equipment, such as a press, is required for making the components from these types of steel. On the other hand, the high-carbon steels have high strength and require a much large stamping equipment. Requirements on tooling strength are therefore high. If the high-carbon steels were not processed appropriately before stamping, the risk of cracking or fracture in the formed components will be considerably high. The formed components that are using the steels with low- to med-carbon contents are usually heat treated with carburizing processes, while those using the steels with high-carbon contents are usually heat treated with through-hardening processes. For certain type of bearings, for example used in food and beverage industries, stainless steels can be used.

The material thicknesses are determined by the desired wall thickness of the composite outer ring 26, the forming scheme, and the availability of materials in the market place. A thicker sheet steel will likely create a heavier wall of the formed composite outer ring 26, which can increase applicability of this technology to a broader range of tapered roller bearing outer rings. The maximum thickness of the sheet steel, however, is often limited by the availability and order quantity of the particular steel grades.

After both the annular backing member 54 and the annular race member 50 have been formed, the annular race member 50 may be press fit into the annular backing member 54 to form the unitized, composite outer ring 26. This can be done either in line with the forming steps of the members 50, 54, or separately. One example process is to heat the annular backing member 54 to an elevated temperature, so that it expands slightly more than the interference amount, and then install the annular race member 50 into the annular backing member 54. The components are then allowed to cool. This heating of the annular backing member 54 can occur inline with the stamping process by using induction heating to rapidly heat up the annular backing member 54. The temperature for heating the annular backing member 54 will depend on the thermal expansion coefficient of the steel and the required interference amount. The interference amount is calculated so that the assembled components can survive the heat treatment process without separating due to different thermal expansion coefficients of the components, and can survive under the highest expected torque or force on the bearing, to prevent any relative movement, axially and circumferentially, between the annular backing member 54 and the annular race member 50.

The unitized, composite outer ring 26, if the annular backing member 54 is also made from steel, then undergoes a hardening thermal treatment procedure to enhance material properties of the unitized, composite outer ring 26 so that the unitized, composite outer ring 26 can support the high load and high contact pressure exerted on the bearing 14 and have a sufficient strength and service life. However, if the annular backing member 54 is made from a material other than metal, the annular race member 50 undergoes a hardening thermal treatment procedure to enhance material properties of the annular race member 50 prior to being press fit into the annular back member 54. Sometimes, as a result of the hardening thermal treatment procedure, dimensions of the unitized, composite outer ring 26 may be altered beyond acceptable tolerances. In this case, the unitized, composite outer ring 26 undergoes a post heat-treatment sizing step to obtain the final operating dimensions. For example the unitized, composite outer ring 26 can be placed between a punch and a die, and drawn and sized to bring the dimensions of the unitized composite outer ring 26 within the acceptable tolerances. Then, the correctly-dimensioned and unitized composite outer ring 26 may be installed into the overall assembly 10.

Various features and aspects of the invention are set forth in the following claims.

What is claimed is:

1. An outer ring for a bearing assembly, the outer ring comprising:
an annular backing member having a body with a first portion defining a radial inner surface and a radial outer surface, and a second portion extending at an angle away from the first portion and defining an axially-facing base surface and a radially-facing end surface; and
an annular race member having a radial outer face, a radial inner face, a first axial end face, and a second axial end face, each axial end face extending between the radial outer face and the radial inner face; and
wherein the annular backing member is in press-fit engagement with the annular race member such that the radial outer face of the annular race member engages the radial inner surface of the annular backing member and the second axial end face of the annular race member engages the axially-facing base surface of the annular backing member such that the annular backing member and the annular race member are unitized;
wherein the second axial end face of the annular race member includes a step that engages the radially-facing end surface of the annular backing member; and
wherein the radial outer surface of the annular backing member is configured to engage a housing to be moveable axially relative to the housing to adjust a preload of the bearing assembly.

2. The outer ring of claim 1, wherein the radially inner surface of the annular race member is sloped to define a raceway on which rolling elements roll.

3. The outer ring of claim 2, wherein of the annular backing member and the annular race member, only the annular race member is configured to come into contact with the rolling elements when the annular backing member and the annular race member are unitized and installed in a bearing assembly.

4. The outer ring of claim 1, wherein a portion of the second axial end face on a first side of the step engages the axially-facing base surface, and an adjacent portion of the second axial end face on an opposite side of the step does not engage the axially-facing base surface.

5. The outer ring of claim 4, wherein the portion of the second axial end face that does not engage the axially-facing base surface is co-planar with a second axial end face of the annular backing member.

6. The outer ring of claim 1, wherein the press-fit engagement is such that the annular backing member and the annular race member cannot move axially or circumferentially relative to one another.

7. A bearing assembly comprising, an outer ring comprising:
  an annular backing member having a body with a first portion defining a radial inner surface and a radial outer surface, and a second portion extending at an angle away from the first portion and defining an axially-facing base surface and a radially-facing end surface; and
an annular race member defining an outer race and having a radial outer face, a radial inner face, a first axial end face, and a second axial end face, each axial end face extending between the radial outer face and the radial inner face wherein the annular backing member is in press-fit engagement with the annular race member such that the radial outer face of the annular race member engages the radial inner surface of the annular backing member and the second axial end face of the annular race member engages the axially-facing base surface of the annular backing member such that the annular backing member and the annular race member are unitized;
  an inner ring, the inner ring defining an inner race; and
  a plurality of rolling elements rollingly engaged with the inner race and the outer race such that the inner ring is configured to rotate relative to the outer ring;
  wherein the second axial end face of the annular race member includes a step that engages the radially-facing end surface of the annular backing member; and
  wherein the radial outer surface of the annular backing member is configured to engage a housing to be moveable axially relative to the housing to adjust a preload of the bearing assembly.

8. The bearing assembly of claim 7, wherein of the annular backing member and the annular race member, only the annular race member is configured to come into contact with the rolling elements when the annular backing member and the annular race member are unitized and installed in the bearing assembly.

9. The bearing assembly of claim 7, wherein a portion of the second axial end face on a first side of the step engages the axially-facing base surface, and an adjacent portion of the second axial end face on an opposite side of the step does not engage the axially-facing base surface.

10. The bearing assembly of claim 7, wherein the press-fit engagement is such that the annular backing member and the annular race member cannot move axially or circumferentially relative to one another.

* * * * *